United States Patent

Kishi et al.

[11] Patent Number: 5,956,520
[45] Date of Patent: Sep. 21, 1999

[54] MICROCOMPUTER FOR ACCESSING A MEMORY OUTSIDE THE CHIP BY USING AN ADDRESS GENERATED FROM THE CPU

[75] Inventors: Toshio Kishi; Toru Shimizu; Shunichi Iwata; Shigeo Mizugaki; Yuichi Nakao; Toshio Doi, all of Itami, Japan

[73] Assignee: Mitsubishi Denki Kabushiki Kaisha, Tokyo, Japan

[21] Appl. No.: 08/710,902

[22] Filed: Sep. 24, 1996

Related U.S. Application Data

[63] Continuation of application No. 08/273,169, Jul. 26, 1994, abandoned.

[30] Foreign Application Priority Data

Jul. 27, 1993 [JP] Japan .................................. 5-184909

[51] Int. Cl.⁶ .................................................. G06F 13/00
[52] U.S. Cl. ........................ 395/800.39; 395/800.01; 395/800.32; 395/800.33; 395/800.36; 395/800.37
[58] Field of Search ........................... 395/800, 497.01, 395/405, 429, 497.04, 830, 833, 834, 800.01, 800.32, 800.33, 800.37, 800.39, 800.36; 364/DIG. 1

[56] References Cited

U.S. PATENT DOCUMENTS

| | | |
|---|---|---|
| 4,349,870 | 9/1982 | Shaw et al. .............................. 364/200 |
| 4,447,881 | 5/1984 | Brantingham et al. .................. 364/488 |
| 4,677,586 | 6/1987 | Magar et al. ............................ 360/900 |
| 4,967,352 | 10/1990 | Keida et al. ............................ 364/200 |
| 5,043,926 | 8/1991 | Naka et al. ............................. 364/550 |
| 5,233,561 | 8/1993 | Mori et al. ............................. 365/210 |
| 5,247,521 | 9/1993 | Akao et al. ........................... 371/16.1 |

OTHER PUBLICATIONS

Circia, "Build Your Own Z80 Computer", pp. 91–93, 1981.

Short, "Microprocessors and Programmed Logic", pp. 97–98, 1987.

'89 Mitsubishi Semiconductor 16–bit One–chip Microcomputer, 2–7, 1989.

*Primary Examiner*—Meng-Ai T. An
*Assistant Examiner*—Dzung Nguyen
*Attorney, Agent, or Firm*—McDermott, Will & Emery

[57] ABSTRACT

An external bus I/F section has a function in which, when a bus access is requested by an instruction execution section, high-order several bits of a logical address generated by a CPU are outputted from an output terminal to the outside of a chip, as a space identifier for indicating which of an integrated ROM space, an integrated RAM space, and the external space is accessed by a currently executed program. A part of an address generated by the CPU is used so that the space which is accessed by the currently executed program is known from the outside in real time without requiring an external hardware.

20 Claims, 7 Drawing Sheets

FIG. 2

| MODE SIGNAL | HIGH-ORDER 2BIT OF ADDRESS | ROM | RAM | EXTERNAL |
|---|---|---|---|---|
| 0 0 (SINGLE) | 0 0 | 1 | 0 | 1 |
| | 0 1, 1 0 | 1 | 1 | 1 |
| | 1 1 | 0 | 1 | 1 |
| 0 1 (EXTENSION) | 0 0 | 1 | 0 | 1 |
| | 0 1, 1 0 | 1 | 1 | 0 |
| | 1 1 | 0 | 1 | 1 |
| 1 0 (MPU) | 0 0 | 1 | 0 | 1 |
| | 0 1, 1 0 | 1 | 1 | 0 |
| | 1 1 | 1 | 1 | 0 |

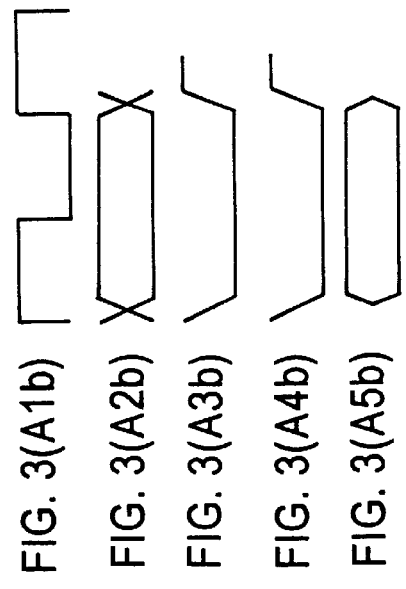
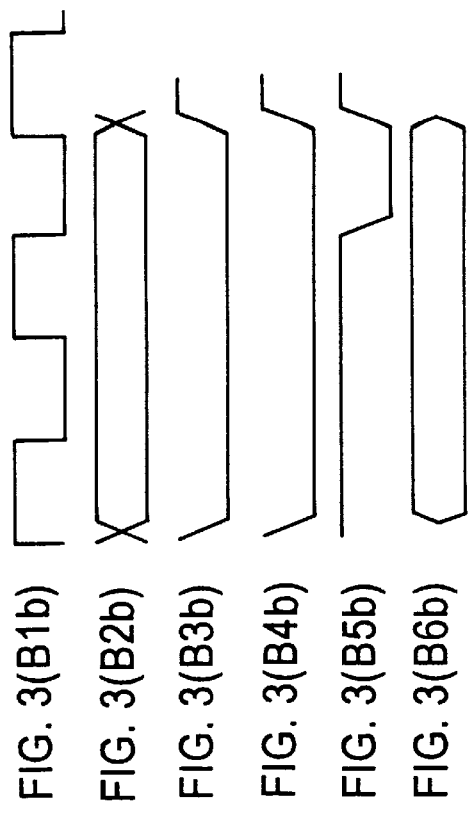
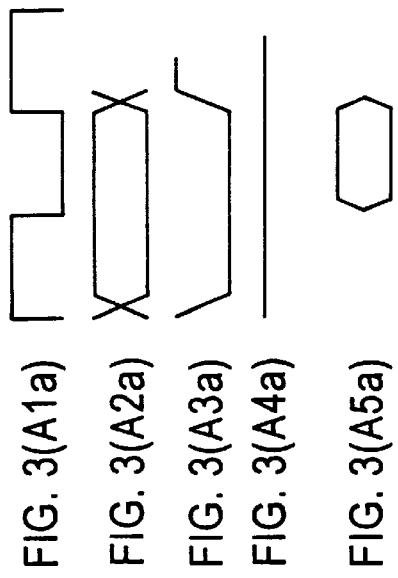
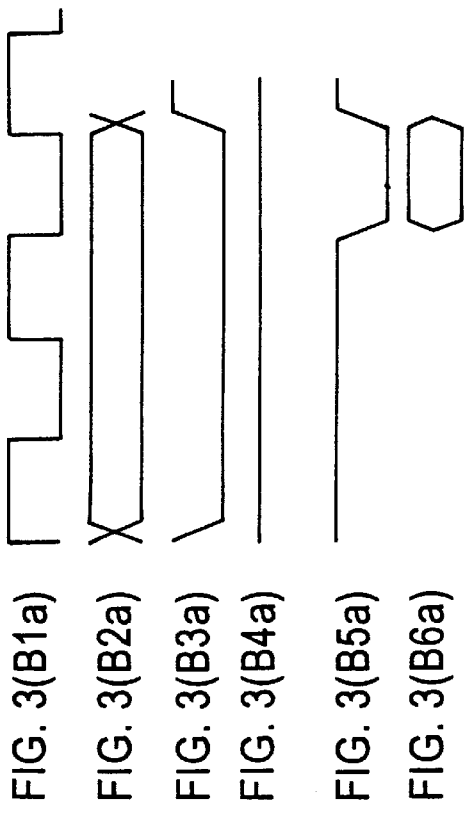

FIG. 4

| | | | SPACE IDENTIFIER(2BIT) |
|---|---|---|---|
| ROM SPACE | INTEGRATED ROM ↑ EXTENSION DIRECTION IN INCREASE OF INTEGRATED ROM CAPACITY | h'FFFF FFFF<br>h'C000 0000 | 1  1 |
| SYSTEM SPACE | | h'BFFF FFFF<br>h'8000 0000 | 1  0 |
| EXTENSION SPACE | | h'7FFF FFFF<br>h'4000 0000 | 0  1 |
| RAM SPACE | EXTENSION DIRECTION IN INCREASE OF INTEGRATED RAM CAPACITY ↑ INTEGRATED RAM | h'3FFF FFFF<br>h'0000 1000 | 0  0 |
| | INTEGRATED PERIPHERAL FUNCTION | h'0000 0FFF<br>h'0000 0000 | |

…

MICROCOMPUTER FOR ACCESSING A MEMORY OUTSIDE THE CHIP BY USING AN ADDRESS GENERATED FROM THE CPU

This application is a continuation of application Ser. No. 08/273,169 filed Jul. 26, 1994 now abandoned.

BACKGROUND OF THE INVENTION

1. Field of the Invention

The invention relates to a one-chip microcomputer in which a CPU, a ROM and a RAM, are integrated in a chip, and which can access a memory or the like outside the chip.

2. Description of Related Art

A one-chip microcomputer integrates therein a CPU, memories, peripheral circuit, etc., and has various modes as well as a mode in which the one-chip microcomputer accesses only integrated circuits. Such modes includes a mode in which the one-chip microcomputer can access a memory outside the chip or the like, and that in which the one-chip microcomputer is used as an MPU.

When debugging is to take place in such a one-chip microcomputer, it is very useful in investigation of the cause of a bug to know which of an integrated ROM, an integrated RAM or an external memory is accessed by a currently executed process. In a prior art one-chip microcomputer, which of the integrated ROM, the intergrated RAM, or the external space is accessed is judged on the basis of address data fetched from an address bus of the CPU.

The one-chip microcomputer of the prior art in such a configuration has the following drawbacks. In order to judge from the outside of the chip which of the integrated ROM, the integrated RAM or and the outside of the chip is accessed, all addresses must be fetched from the address bus. An external hardware is required to identify the address space on the basis of the fetched addresses. If terminals of the address bus of the CPU are not disposed on the outside of the chip it is impossible to know from the outside during execution of a program, which of the integrated ROM, the integrated RAM or the external space is accessed.

SUMMARY OF THE INVENTION

It is a primary object of the invention to provide a one-chip microcomputer in which a part of an address data is outputted to the outside of a chip so that the access space wherein a program is currently executed is identified from the outside on the basis of data of a minimum bit number.

The one-chip microcomputer of the invention comprises: a circuit for extracting bits, for example, high-order 2 bits of an address generated by a CPU, as a space identifier, which is able to identify an address space wherein an access space is located, and for outputting the space identifier to the outside of the chip; and an output terminal of the circuit. According to the one-chip microcomputer of the invention, bits from which an address space wherein an access space is located can be identified, for example, high-order 2 bits of an address generated by a CPU are extracted as a space identifier, and the space identifier is outputted from the output terminal to the outside of the chip. The user can judge in real time which of the integrated ROM space, the integrated RAM space or the external space is accessed by a currently executed program.

The above and further objects and features of the invention will more fully be apparent from the following detailed description with accompanying drawings.

BRIEF DESCRIPTION OF THE DRAWINGS

FIG. 2 is a diagram showing the operation of an access control circuit of the one-chip microcomputer of the invention;

FIGS. 3(A1a) to 3(B6b) are timing charts of an access operation of the one-chip microcomputer of the invention;

FIG. 4 is a diagram showing the allocation state of an address space in the one-chip microcomputer of the invention;

DESCRIPTION OF THE PREFERRED EMBODIMENTS

Hereinafter, the invention will be described in detail with reference to the drawings showing an embodiment of the invention.

Figure 1:
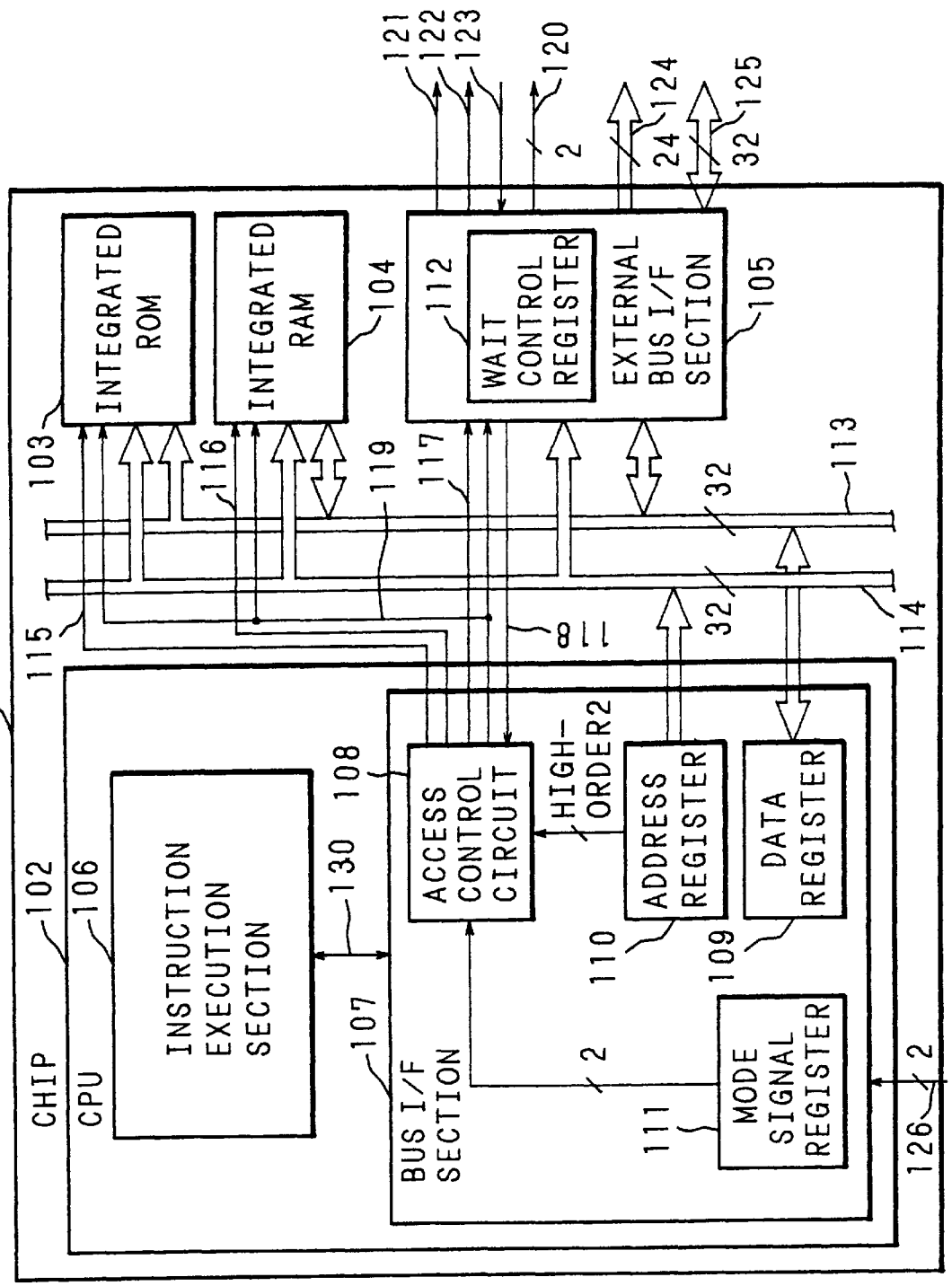
FIG. 1 is a block diagram showing the configuration of the one-chip microcomputer of the invention.

FIG. 1 is a block diagram showing the configuration of the one-chip microcomputer of the invention. In the figure, 101 designates a chip. A CPU 102, an integrated ROM 103, an integrated RAM 104 and an external bus I/F section 105 which controls data input and output between the devices and the external are mounted on the chip 101. The CPU 102, the integrated ROM 103, the integrated RAM 104, and the external bus I/F section 105 are connected with each other through a data bus (32 bits) 113 and an address bus (32 bits) 114.

The CPU 102 comprises an instruction execution section 106 which reads out an instruction from the integrated ROM 103 and executes the instruction, and a bus I/F section 107 which controls data input and output between the devices in the chip and the data bus 113 and the address bus 114 in accordance with an address and an access request 130 supplied from the instruction execution section 106. In a read process, read data from the memories are inputted to the instruction execution section 106 through the data bus 113 and the bus I/F section 107. By contrast, in a write process, write data outputted from the instruction execution section 106 are written into the memories through the bus I/F section 107 and the data bus 113.

The bus I/F section 107 comprises an address register (32 bits) 110 for holding an address 130 supplied together with a bus access request from the instruction execution section 106, an access control circuit 108, a data register (32 bits) 109 for, in a read process, holding data read out from the memories and input through the data bus 113, and for, in a write process, holding write data to be outputted to the memories through the data bus 113, and a mode signal register (2 bits) 111 for holding a mode signal (2 bits) 126 which is set by the user and supplied from the outside of the chip. When a bus access request is issued from the instruction execution section 106, the access control circuit 108 makes one of an integrated ROM selection signal 115, an integrated RAM selection signal 116 an external effective signal 117 effective in accordance with high-order 2 bits (i.e., a space identifier which will be described in detail later) of the address and the mode signal held in the mode signal register 111, so that one of the integrated ROM 103, the integrated RAM 104 and the outside of the chip is selected to be accessed. Furthermore, the access control circuit 108 sets a read/write signal 119 to be a read enable state or a write enable state in accordance with a control signal 130 from the instruction execution section 106. When the bus access request is issued from the instruction execution section 106, the address (32 bits) held in the address register 110 is outputted to the address bus 114.

The external bus I/F section 105 outputs the space identifier 120 from an output terminal. The space identifier 120 consists of high-order 32 bits among the 32 bits of an address which is generated by the CPU 102 and supplied from the bus I/F section 107 through the address bus 114. Since the user previously knows the space allocation (see FIG. 4) which will be described later, the user can judge which of the spaces is accessed by the currently executed program, on the basis of the 2-bit space identifier 120 outputted from the output terminal.

When the outside of the chip is accessed, the external bus I/F section 105 outputs an address 124 of low-order 24 bits among the 32 bits of the address, to the outside of the chip. In response to the external effective signal 117 which is made effective by the access control circuit 108, the external bus I/F section 105 makes an external effective signal 121 effective for the outside of the chip, and, in response to a read/write signal 119, sets a read/write signal 122 for the outside of the chip to be a read enable state or a write enable state, so that data (32 bits) 125 are inputted from the outside of the chip to the data bus 113 or outputted from the data bus 113 to the outside of the chip.

The external bus I/F section 105 comprises a wait control register 112 which is composed of a field indicative of effective/ineffective and a field for setting a wait number. In the case where the wait control register 112 is effective, when an external space is accessed, the external bus I/F section 105 inserts the wait number set in the wait control register 112 into a data termination signal 123 returned from the outside, and then outputs the data termination signal 123 to the CPU 102. By contrast, in the case where the wait control register 112 is ineffective, when the data termination signal 123 is returned from the outside, the external bus I/F section 105 immediately outputs a data termination signal 118 to the CPU 102. The wait control register 112 is allocated as one of integrated peripheral functions (address: h'0000 0000 to h'0000 0FFF) of the space of the integrated RAM 104.

The data termination signal 118 is a signal indicative of the termination of the bus cycle of an access. In a read operation, the signal indicates that read data are ready, and, in a write operation, the signal indicates that the write operation is terminated in the cycle.

Next, the operation of the access control circuit 108 of the one-chip microcomputer of the invention will be described specifically.

The one-chip microcomputer of the invention has three modes, a single mode in which only the integrated ROM 103, and the integrated RAM 104 are used, an extension mode in which the address area is extended to the outside in addition to the integrated ROM 103 and the integrated RAM 104, and an MPU mode in which the one-chip microcomputer is used as an MPU and the space of the integrated ROM 103 is used as an external memory. Each mode is previously designated by the user with using the 2-bit mode designation signal. The designated mode is held in the mode signal register 111. When the mode signal is "b'00", the single mode is fixed, when the mode signal is "b'01", the extension mode is fixed, and, when the mode signal is "b'10", the MPU mode is fixed.

In the single mode, as shown in FIG. 2, the access control circuit 108 sets the integrated RAM selection signal 116 to be an enable state ("0") when high-order 32 bits of an address are "b'00", and sets the integrated ROM selection signal 115 to be an enable state ("0") when high-order 2 bits of an address are "b'11". In the extension mode, the access control circuit 108 sets the integrated RAM selection signal 116 to be an enable state ("0") when high-order 2 bits of an address are "b'00", sets the external effective signal 117 to be an enable state ("0") when high-order 2 bits of an address are "b'01" or "b'10", and sets the integrated ROM selection signal 115 to be an enable state ("0") when high-order 32 bits of an address are "b'11". In the MPU mode, the access control circuit 108 sets the integrated RAM selection signal 116 to be an enable state when high-order 2 bits of an address are "b'00", and sets the external effective signal 117 to be an enable state when high-order 32 bits of an address are "b'01", "b'10" or "b'11".

Next, the access operation of the one-chip microcomputer of the invention will be described with reference to the timing charts of FIGS. 3(A1a) to 3(B6b). FIGS. 3(A1a) to 3(A5a) are the case where an integrated memory is used during read access, FIGS. 3(A1b) to 3(A5b) are the case where an integrated memory is used during write access, FIGS. 3(B1a) to 3(B6a) are the case where an external memory is used during read access, and FIGS. 3(B1b) to 3(B6b) are the case where an external memory is used during write access. FIG. 3(A1a) and 3(A1b) depict a clock signal, FIGS. 3(A2a) and 3(A2b) depict the address/space identifier signal, FIGS. 3(A3a) and 3(A3b) depict the ROM or RAM selection signal, FIGS. 3(A4a) and 3(A4b) depict the read/write signal, and FIGS. 3(A5a) and 3(A5b) depict outputting of data to the data bus. FIG. 3(B1a) and 3(B1b) depict a clock signal, FIGS. 3(B2a) and 3(B2b) depict the address/space identifier signal, FIGS. 3(B3a) and 3(B3b) depict the external effective signal, FIGS. 3(B4a) and 3(B4b) depict the read/write signal, FIGS. 3(B5a) and 3(B5b) depict the data termination signal, and FIGS. 3(B6a) and 3(B6b) depict outputting of data to the data bus. In the embodiment, when the read/write signals 119 and 122 are "1", the read enable state is set, and, when the signals are "0", the write enable state is set. When the data termination signals 118 and 123 are "0", they are in the enable state.

In the case where an integrated memory is used (FIGS. 3(A1a) to 3(A5b)), the integrated ROM selection signal 115, or the integrated RAM selection signal 116 is set to be an enable state in synchronization with the rising of a clock, and at the same time the address/space identifier and the read/write signal 119 are made effective. In a read access, when a half clock period has elapsed after the determination of the address, data read out from the integrated memory is outputted to the data bus 113. In a write access, data are outputted to the data bus 113 at the same timing as the address, and the operation of writing the data into the integrated memory is terminated before the next clock period. As described above, when an integrated memory is used, the read/write operation is terminated in one cycle.

In the case where an external memory is used for conducting a wait (FIGS. 3(B1a) to 3(B6b)), the external effective signal 117 is set to be the enable state in synchronization with the rising of the clock, and at the same time the address/space identifier and the read/write signal 119 are made effective. In a read access, the effective value of the read/write signal 119 is maintained until the data termination signal 118 is set to be an enable state ("0"), and read data are outputted to the data bus 113 when the data termination signals 118 is set to be the enable state. In a write access, the data writing process is terminated in a cycle where the data termination signals 118 is enabled. The number of waits for the data termination signal 118 outputted from the external bus I/F section 105 to the CPU 102 is a value which is set in the wait control register 112 in accordance with the time period required for the access to the outside, or a value which is externally given.

FIG. 4 is a diagram showing the allocation state of an address space in the one-chip microcomputer of the invention. The one-chip microcomputer of the invention has an address space of 4 GB which is represented by a 32-bit logical address. The address space is partitioned into four spaces (a RAM space, an extension space, a system space, and a ROM space) in the unit of 1 GB, and managed with using high-order 32 bits (i.e., the space identifier) of an address. The user can judge which of the spaces is currently accessed, on the basis of the space identifier 120 which is outputted to the outside from the output terminal of the external bus I/F section 105. As described above, the access control circuit 108 selects one of the address spaces in accordance with the space identifier.

The spaces are characterized as follows:

RAM Space

The RAM space is allocated to integrated peripheral functions such as registers, etc., and the integrated RAM. The integrated peripheral functions are installed in an area form "h'0000 0000" to "h'0000 0FFF", and the integrated RAM in an area extending from "h'0000 1000" toward "h'3FFF FFFF".

ROM Space

The integrated ROM is installed in an area starting from "h'FFFF FFFF" toward "h'C0000 0000".

System Space

The system space is installed in an area from "h'8000 0000" to "h'BFFF FFFF, and set as a reserved area which the user cannot access and which is preferentially used by a resident monitor, an in-circuit monitor, an ICE monitor, and the like.

Extension Space

The extension space is installed in an area from "h'4000 0000" to "h'7FFF FFFF, and used for instructions for extending the address area to the outside (i.e., extension mode), as well as for the integrated ROM, and the integrated RAM.

Figure 5:
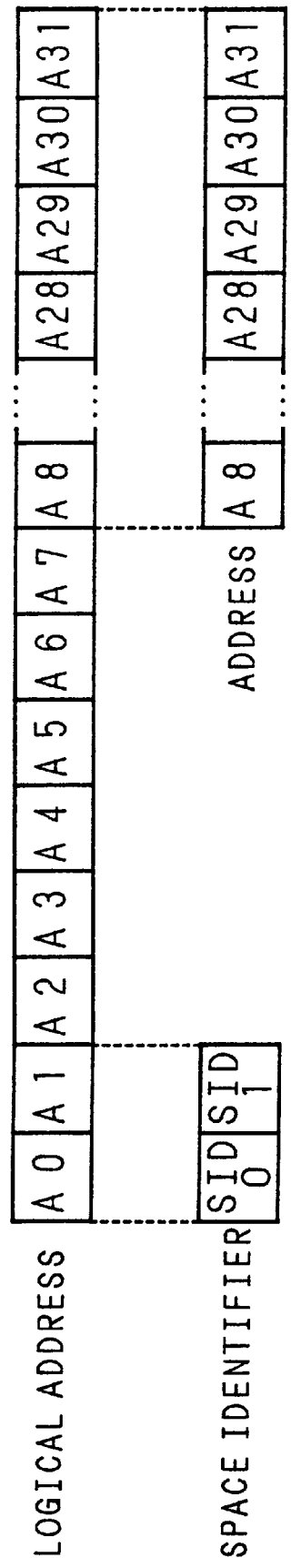
FIG. 5 is a diagram showing the relationship between a logical address and address representation of a real device in the one-chip microcomputer of the invention.

FIG. 5 is a diagram showing the relationship between a logical address generated by the CPU 102 in the one-chip microcomputer of the invention, and the space identifier 120 and the address 124 which are outputted to the outside of the chip. In the one-chip microcomputer of the invention, the address 124 outputted to the outside of the chip consists of low-order 24 bits (A8 to A31) of a 32-bit logical address generated in the chip. Each address space of 1 GB is identified by the space identifier SID0 to SID1, and an address in the space is represented by address bits A8 to A31. In both the inside and the outside of the chip, bits A2 to A7 of the logical address are not used for addressing.

Figure 6:
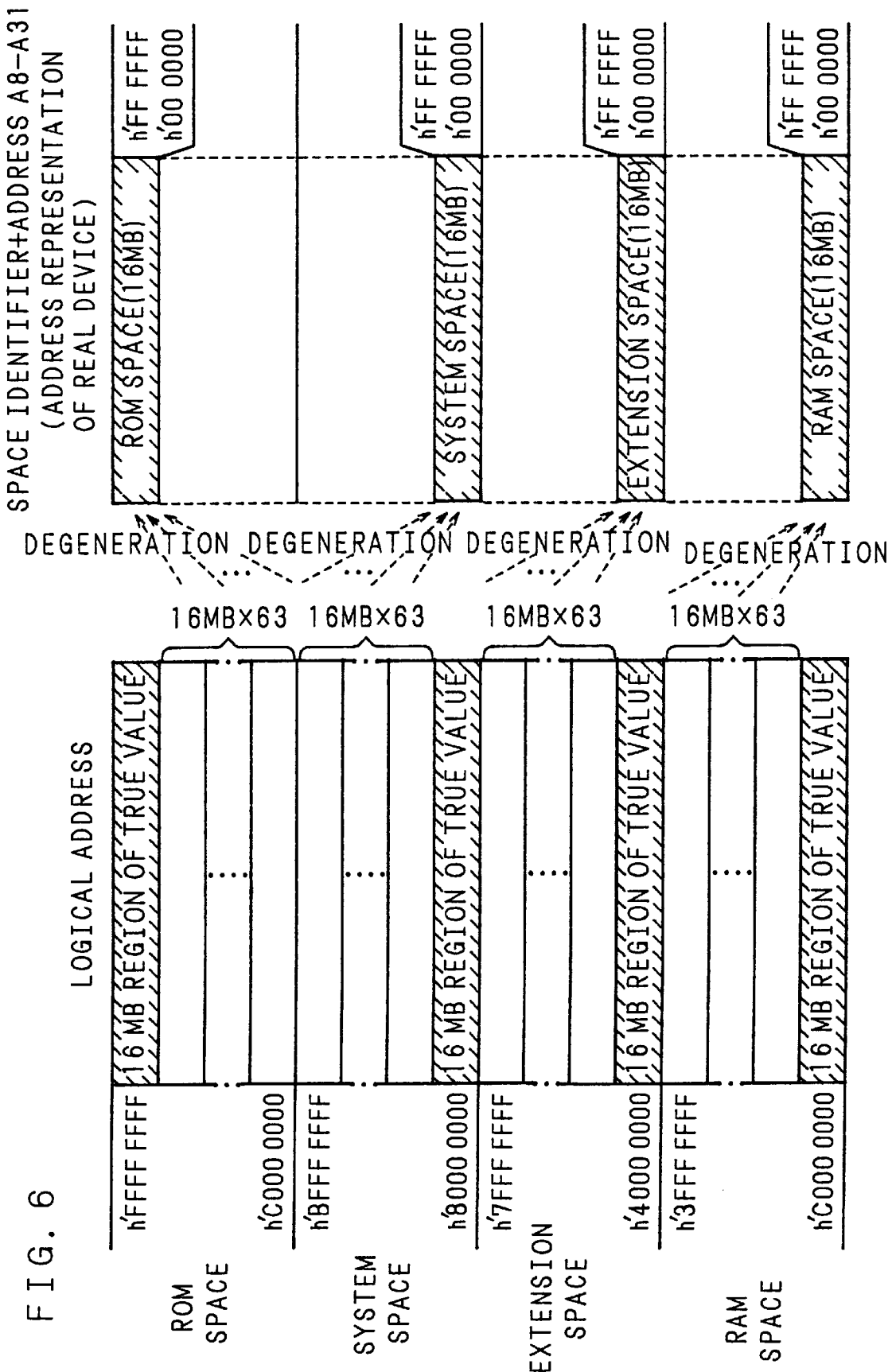
FIG. 6 is a diagram showing the relationship between logical addresses of spaces and address representation of a real device in the one-chip microcomputer of the invention.

FIG. 6 is a diagram showing the relationships between logical addresses and address representation of the real devices in the one-chip microcomputer of the invention. The logical address bits A2 to A7 are not used for addressing. When all the logical address bits A2 to A7 are "0", therefore, any access relating to sixty-three 16 MB areas (called "ghost areas") except "16 MB area of true value" of each 1 GB space is degenerated to an access to "16 MB area of true value". Even when a memory is extended, however, addresses of the extended memory area may be used with code extension while using the 24-bit representation (A8 to A31) which is the same as that used for "16 MB area of true value".

Figure 7:
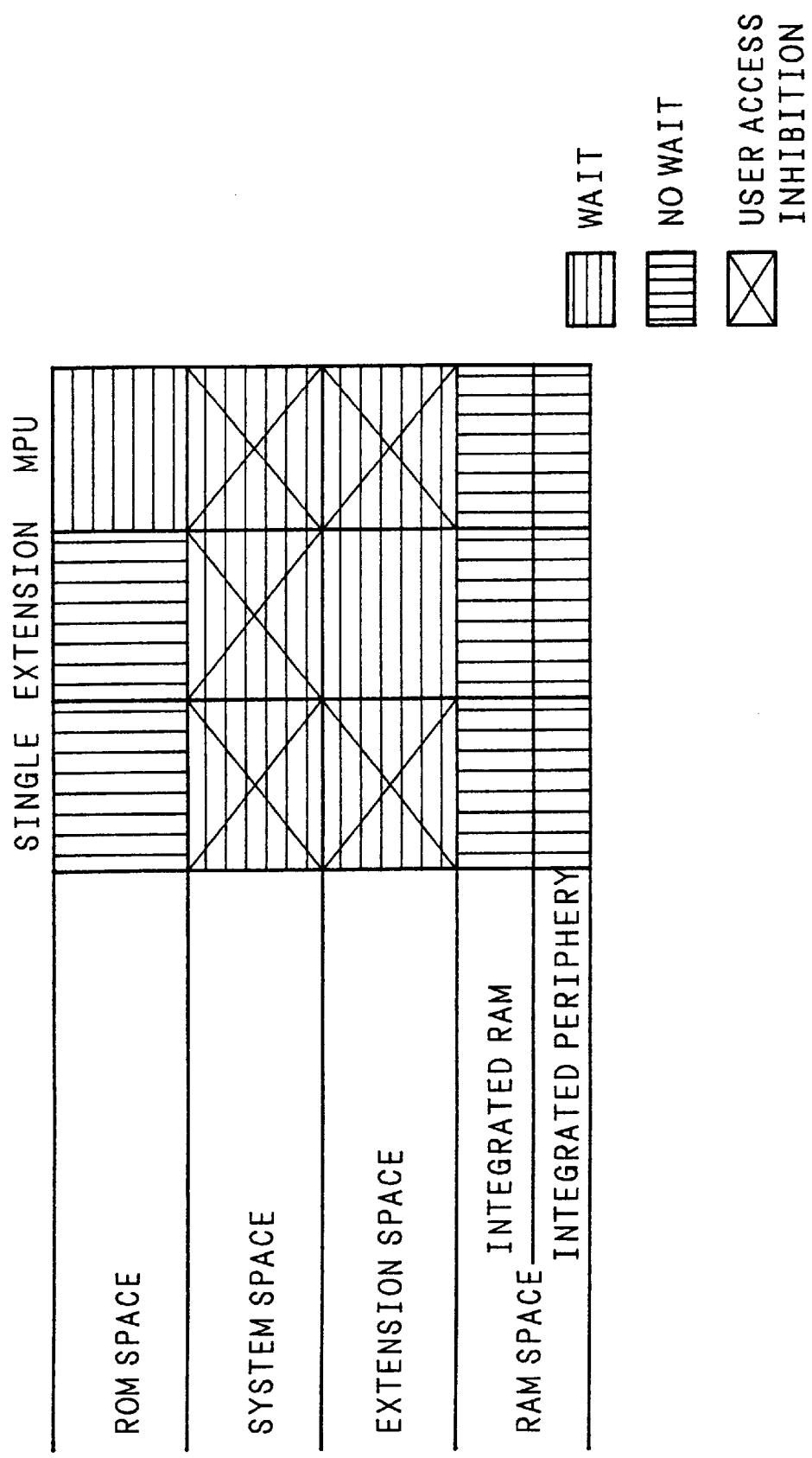
FIG. 7 is a diagram showing the wait attribute of the one-chip microcomputer of the invention.

FIG. 7 is a diagram showing the wait attribute of the one-chip microcomputer of the invention. In principle, the relationship between an effective address and a wait in an access to this address is established by an attribute management in the unit of a space (RAM/extension/system/ROM space). In the single mode, since only the integrated ROM and the integrated RAM are used, there is no wait in an access to the ROM space or the RAM space. In the extension mode, the wait state is set when the external extension space is to be accessed. In the MPU mode, when the ROM space is selected, the external is accessed, and therefore the access to the ROM space is placed in the wait state.

As described above, the one-chip microcomputer of the invention can achieve excellent advantages of making it possible to know from the outside in real time the space which is accessed by a currently executed program, on the basis of a space identifier consisting of a minimum number of bits, and of enabling the space identifier to be obtained by a simple circuit because a part of an address generated by the CPU is used as the space identifier.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A one-chip microcomputer comprising:
   a CPU, a ROM and a RAM integrated within the chips, wherein each of the integrated ROM, the integrated RAM and a location outside of the chip is selectively accessed using an address generated by the CPU in accordance with execution of instructions;
   a circuit for extracting a portion of bits of the address generated by the CPU, as an area identifier for an access area, and for outputting the area identifier to the location outside of the chip, the area identifier identifying which of the integrated ROM, the integrated RAM, and the location outside of the chip is being accessed by the CPU; and
   an output terminal for said area identifier,
   wherein an integrated ROM exists in an area starting from a start address of the access area, and an integrated RAM exits in an area starting from a final address of the access area and being disposed toward the start address thereof, and an address data of a bit number among bits except the area identifier which is sufficient for representing a whole of one partial area of the integrated ROM or the intergrated RAM is subjected to code extension thereby representing an address of another partial area of the intergrated ROM or the integrated RAM.

2. A one-chip microcomputer according to claim 1, further comprising an access control circuit for selecting one of accesses to the integrated ROM, the integrated RAM and the location outside of the chip, on the basis of the area identifier.

3. A one-chip microcomputer according to claim 2, wherein said microcomputer has an extension mode in which the location outside of the chip can be accessed, and an MPU mode in which the chip is used as a microprocessor, and, said access control circuit, in the extension mode, selects the access to the location outside of the chip only when the access to the location outside of the chip is selected by said area identifier, and, in the MPU mode, selects the access to the location outside of the chip also when the access to the integrated ROM is selected by said area identifier.

4. A one-chip microcomputer according to claim 3, further comprising a register for holding a mode signal which is supplied from the location outside of the chip.

5. A one-chip microcomputer according to claim 3, further comprising a wait circuit for setting a wait state to a timing of transmitting completion of an access operation to the CPU, only when the location outside of the chip is accessed in the extension mode, or only when the integrated ROM is accessed in the MPU mode.

6. A one-chip microcomputer comprising:
a CPU, a ROM and a RAM integrated within the chip, wherein each of the integrated ROM, the integrated RAM and a location outside of the chip is selectively accessed using an address generated by the CPU in accordance with execution of instructions;
a circuit for extracting a predetermined number of high-order bits of the address generated by the CPU, as an area identifier for an access area, and for outputting the area identifier to the location outside of the chip; and
an output terminal for said area identifier, wherein
the area identifier identifies which of the integrated ROM, the integrated RAM, and the location outside of the chip is being accessed by the CPU with the integrated ROM, the integrated RAM, and the location outside of the chip existing in access areas which have different values of high-order bits which are extracted as the area identifier, respectively, and wherein an integrated ROM exists in an area starting from a start address of the access area, and an intergrated RAM exists in an area starting from a final address of the access area and being disposed toward the start address thereof, and an address data of a bit number among bits except the area identifier which is sufficient for representing a whole of one partial area of the intergrated ROM or the integrated RAM is subjected to code extension, thereby representing an address of another partial area of the integrated ROM or the integrated RAM.

7. A one-chip microcomputer according to claim 6, wherein said area identifier consists of 2 bits.

8. A one-chip microcomputer comprising:
an integrated ROM;
an integrated RAM;
a CPU for selectively accessing one of said integrated ROM, said integrated RAM and a location outside of the chip using an address generated in accordance with execution of instructions; and
an area identifier output circuit for extracting a predetermined number of bits of the address generated by said CPU, as an area identifier for identifying an access area, and for outputting the area identifier to the location outside of the chip, the area identifier identifying which of the integrated ROM, the integrated RAM, and the location outside of the chip is being accessed by the CPU, and wherein an integrated ROM exists in an area starting from a start address of the access area, and an intergrated RAM exists in an area starting from a final address of the access area and being disposed toward the start address thereof, and an address data of a bit number among bits except area identifier which is sufficient for representing a whole of one partial area of the integrated ROM or the integrated RAM is subjected to code extension, thereby representing an address of another partial area of the intergrated ROM or the integrated RAM.

9. A one-chip microcomputer according to claim 8, wherein said CPU comprises:
an access control circuit for selecting one of accesses to said integrated ROM, said integrated RAM, and the location outside of a chip, on the basis of said area identifier; and
a register for holding a mode signal which is supplied from the location outside of the chip and which designates one of a single mode in which only said integrated ROM, and said integrated RAM are used, an extension mode in which the location outside of the chip can be accessed, and an MPU mode in which the chip is used as a microprocessor.

10. A one-chip microcomputer according to claim 9, wherein said area identifier output circuit comprises a wait circuit for setting a wait state to a timing of transmitting completion of an access operation to said CPU, only when the location outside of the chip is accessed in extension mode, or only when said integrated ROM is accessed in the MPU mode.

11. A one-chip microcomputer comprising:
a CPU, a ROM and a RAM integrated within the chip, wherein each of the integrated ROM, the integrated RAM and a location outside of the chip is selectively accessed using an address generated by the CPU in accordance with execution of instructions;
a circuit for extracting a portion of bits of the address generated by the CPU, as an area identifier for an access area, and for outputting the area identifier to the location outside of the chip, the area identifier identifying which of the integrated ROM, the integrated RAM, and the location outside of the chip is being accessed by the CPU; and
an output terminal for said area identifier,
wherein an integrated ROM exists in an area starting from a final address of the access area and exists toward a start address thereof, and an integrated RAM exists in a area starting from the start address of the access area, and an address data of a bit number among bits except said area identifier which is sufficient for representing a whole of one partial area of the integrated ROM or the integrated RAM is subjected to code extension, thereby representing an address of another partial area of the integrated ROM or the integrated RAM.

12. A one-chip microcomputer comprising:
a CPU, a ROM and a RAM integrated within the chip, wherein each of the integrated ROM, the integrated RAM and a location outside of the chip is selectively accessed using an address generated by the CPU in accordance with execution of instructions;
a circuit for extracting a predetermined number of high-order bits of the address generated by the CPU, as an area identifier for an access area, and for outputting the area identifier to the location outside of the chip; and
an output terminal for said area identifier, wherein
the area identifier identifies which of the integrated ROM, the integrated RAM, and the location outside of the chip is being accessed by the CPU with the integrated ROM, the integrated RAM, and the location outside of the chip exists in access areas which have different values of high-order bits which are extracted as the area identifier, respectively, and an integrated ROM exists in an area starting from a final address of the access area and is disposed toward a start address thereof, and an integrated RAM exists in an area starting from the start address of the access area, and an address data of a bit number among bits except said area identifier which is sufficient for representing a whole of one partial area of the integrated ROM or the integrated RAM is subjected to code extension, thereby representing an address of another partial area of the integrated ROM or the integrated RAM.

13. A one-chip microcomputer comprising:

an integrated ROM;

an integrated RAM;

a CPU for selectively accessing one of said integrated ROM, said integrated RAM and a location outside of the chip using an address generated in accordance with execution of instructions; and an area identifier output circuit for extracting a predetermined number of bits of the address generated by said CPU, as an area identifier for identifying an access area, and for outputting the area identifier to the location outside of the chip, the area identifier identifying which of the integrated ROM, the integrated RAM, and the location outside of the chip is being accessed by the CPU and wherein and an integrated ROM exists in an area starting from a final address of the access area and is disposed toward a start address thereof, and an integrated RAM exists in an area starting from the start address of the access area, and an address data of a bit number among bits except said area identifier which is sufficient for representing a whole of one partial area of the integrated ROM or the integrated RAM is subjected to code extension, thereby representing an address of another partial area of the integrated ROM or the integrated RAM.

14. A one-chip microcomputer according to claim 11, further comprising an access control circuit for selecting one of accesses to the integrated ROM, the integrated RAM and the location outside of the chip, on the basis of the area identifier.

15. A one-chip microcomputer according to claim 11, wherein said microcomputer has an extension mode in which the location outside of the chip can be accessed, and an MPU mode in which the chip is used as a microprocessor, and, said access control circuit, in the extension mode, selects the access to the location outside of the chip only when the access to the location outside of the chip is selected by said area identifier, and, in the MPU mode, selects the access to the location outside of the chip also when the access to the integrated ROM is selected by said area identifier.

16. A one-chip microcomputer according to claim 11, further comprising a register for holding a mode signal which is supplied from the location outside of the chip.

17. A one-chip microcomputer according to claim 11, further comprising a wait circuit for setting a wait state to a timing of transmitting completion of an access operation to the CPU, only when the location outside of the chip is accessed in the extension mode, or only when the integrated ROM is accessed in the MPU mode.

18. A one-chip microcomputer according to claim 12, wherein said area identifier consists of 2 bits.

19. A one-chip microcomputer according to claim 13, wherein said CPU comprises:

an access control circuit for selecting one of accesses to said integrated ROM, said integrated RAM, and the location outside of a chip, on the basis of said area identifier; and a register for holding a mode signal which is supplied from the location outside of the chip and which designates one of a single mode in which only said integrated ROM, and said integrated RAM are used, an extension mode in which the location outside of the chip can be accessed, and an MPU mode in which the chip is used as a microcomputer.

20. A one-chip microcomputer according to claim 13, wherein said area identifier output circuit comprises a wait circuit for setting a wait state to a timing of transmitting completion of an access operation to said CPU, only when the location outside of the chip is accessed in the extension mode, or only when said integrated ROM is accessed in the MPU mode.

* * * * *